Figure 1:
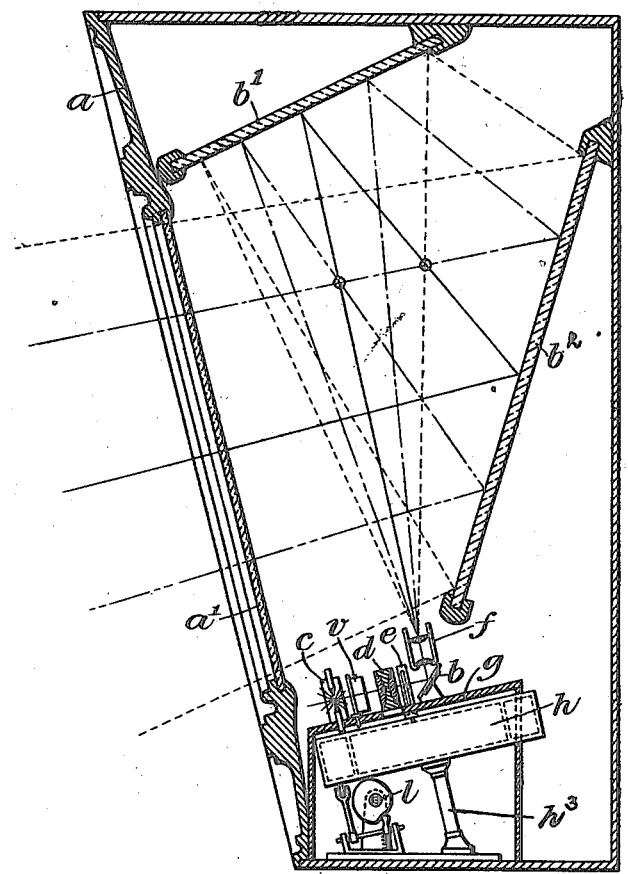

J. GUERZONI & R. PECHKRANZ.
AUTOMATIC PROJECTION APPARATUS.
APPLICATION FILED MAY 12, 1911.

1,161,660.

Patented Nov. 23, 1915.
5 SHEETS—SHEET 1.

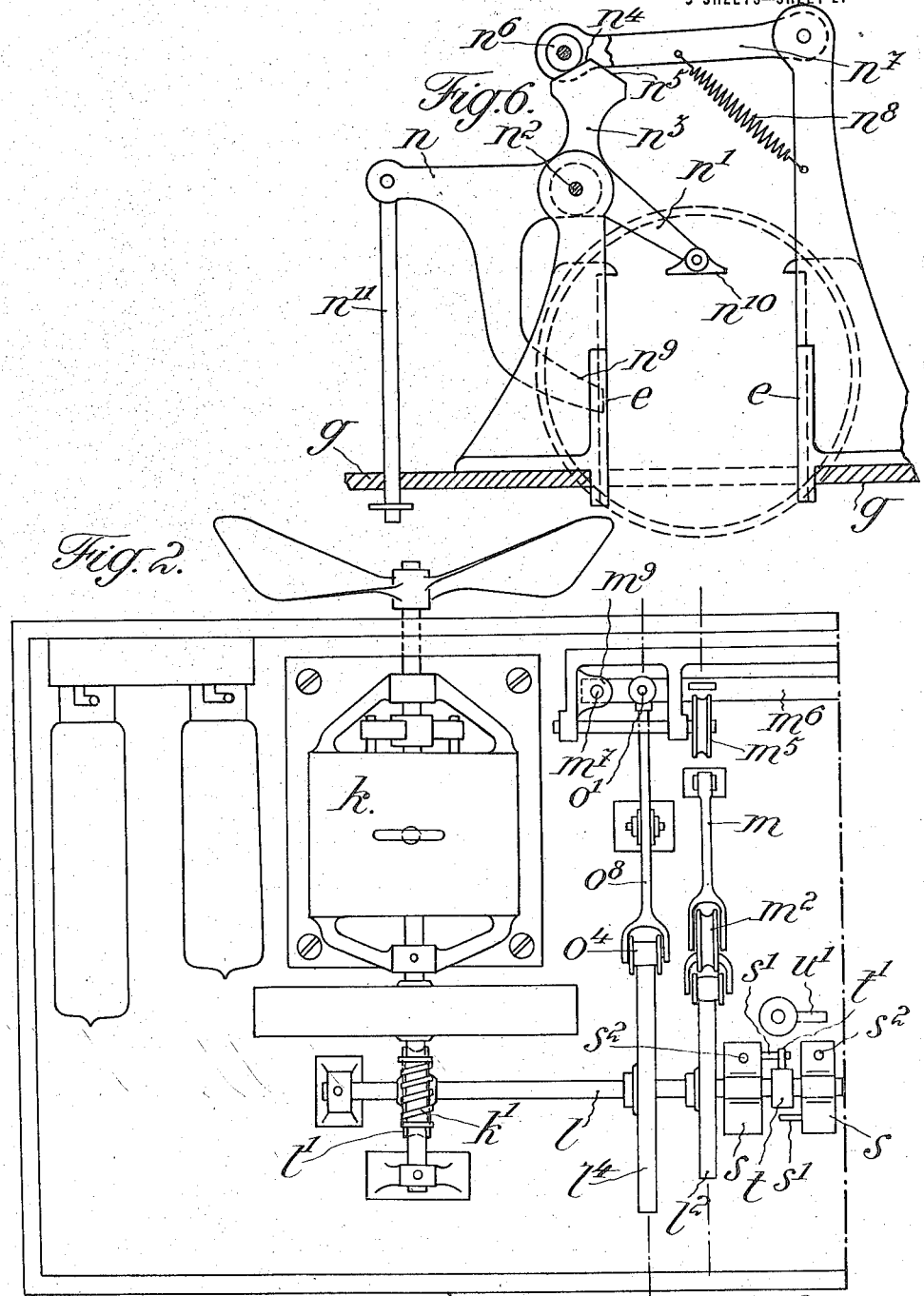

J. GUERZONI & R. PECHKRANZ.
AUTOMATIC PROJECTION APPARATUS.
APPLICATION FILED MAY 12, 1911.
1,161,660.
Patented Nov. 23, 1915.
5 SHEETS—SHEET 3.
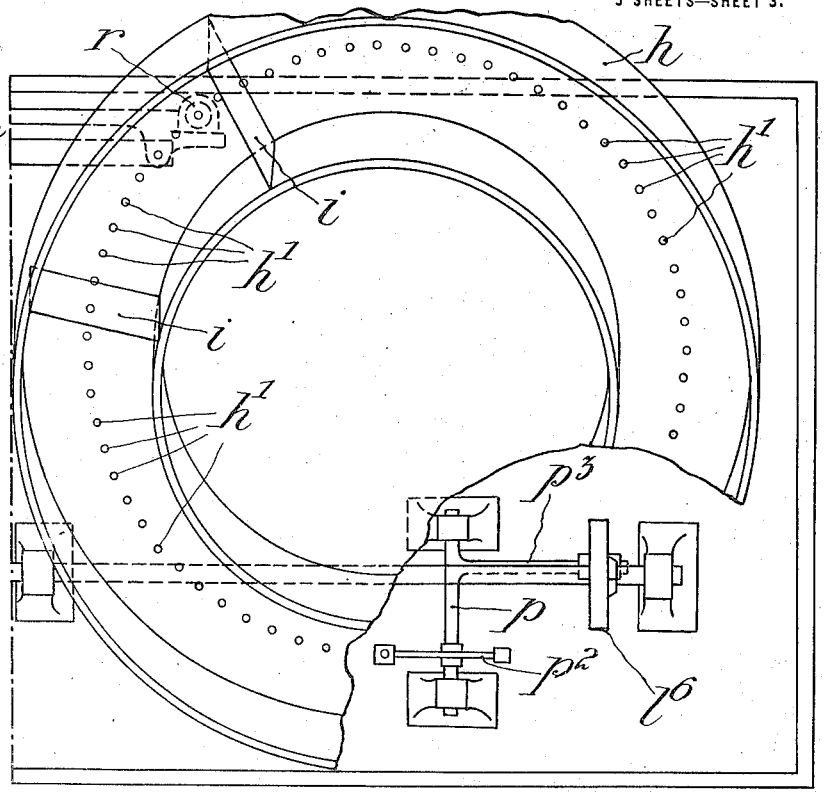
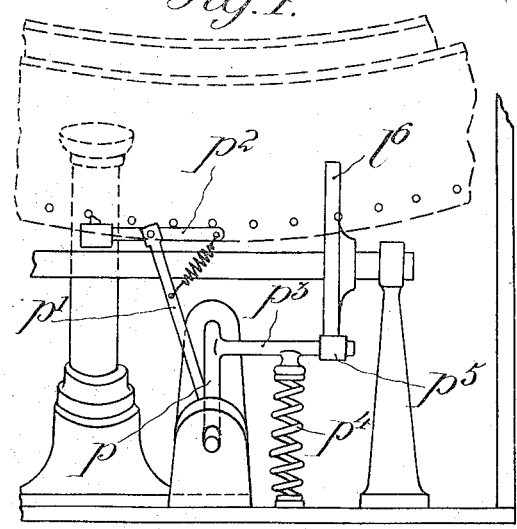
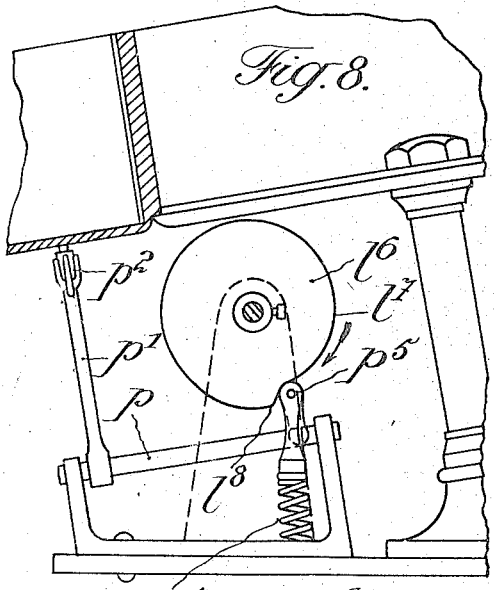

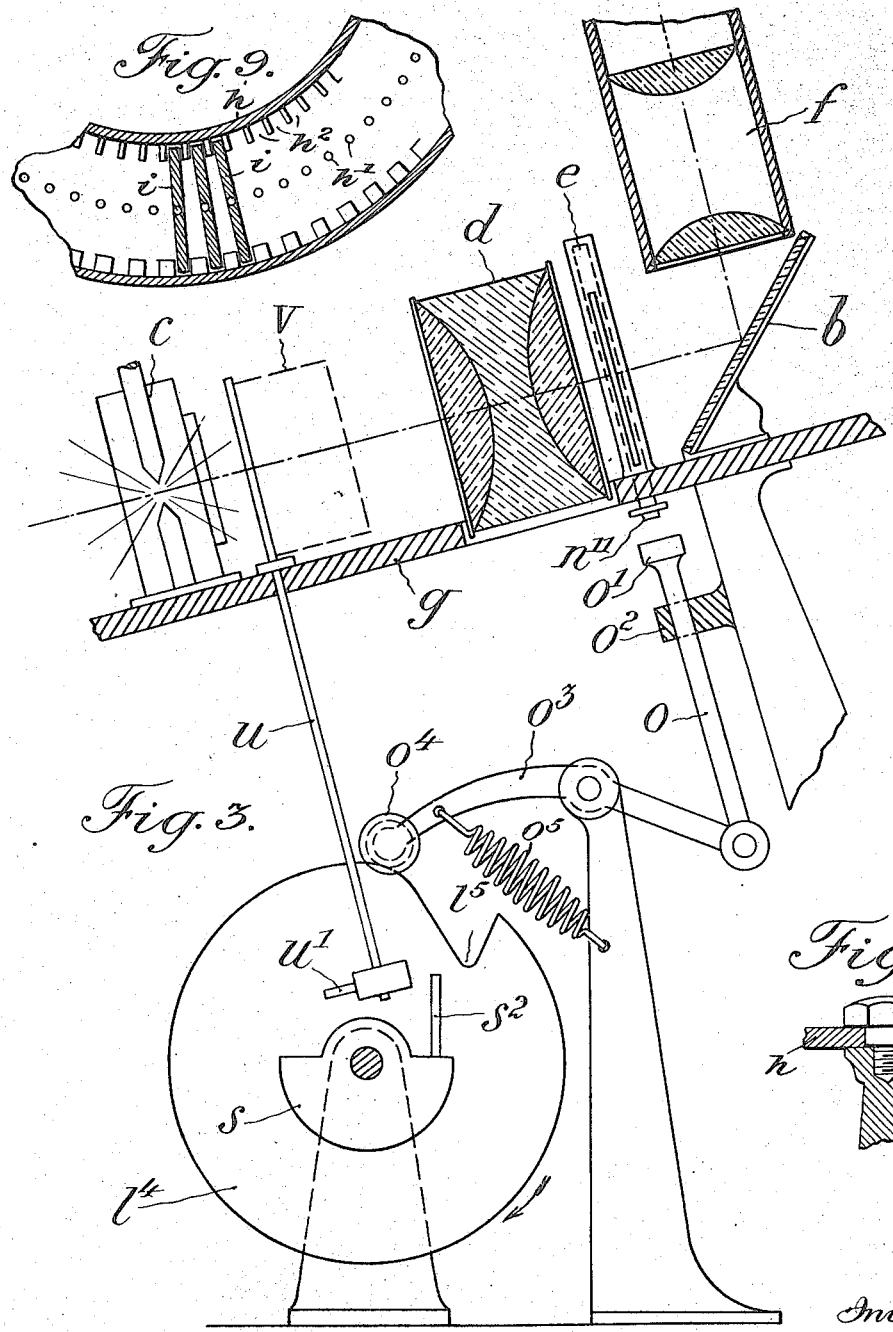

J. GUERZONI & R. PECHKRANZ.
AUTOMATIC PROJECTION APPARATUS.
APPLICATION FILED MAY 12, 1911.
1,161,660.
Patented Nov. 23, 1915.
5 SHEETS—SHEET 5.
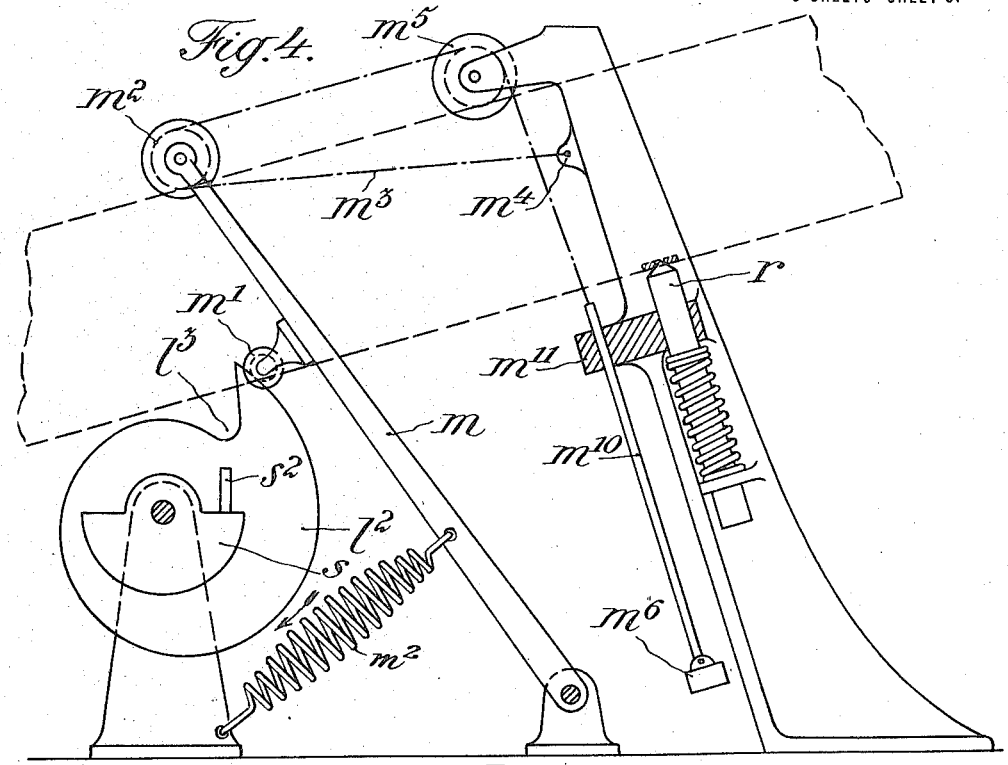
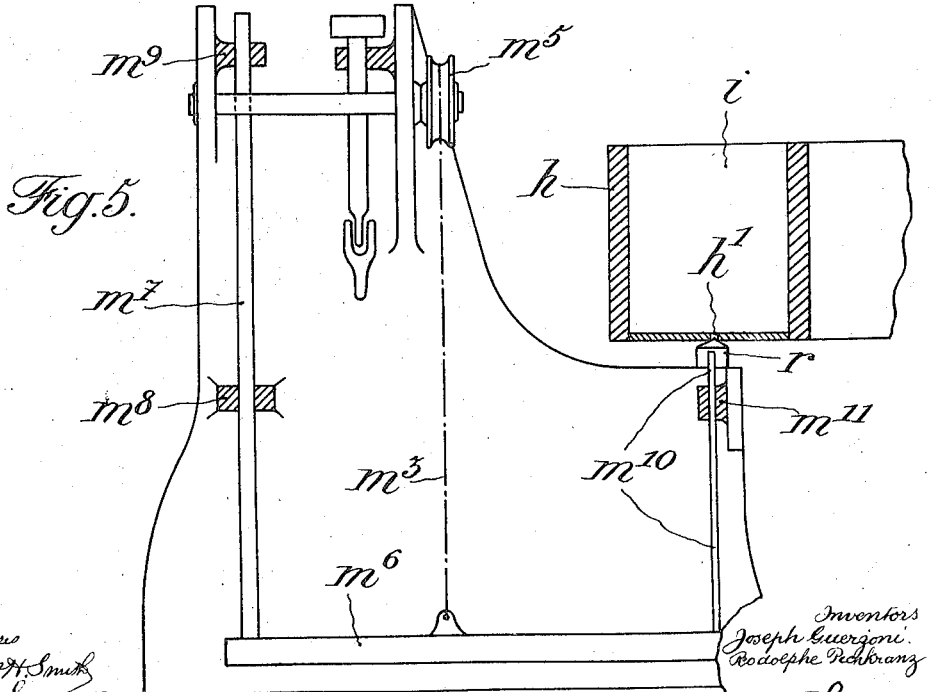

UNITED STATES PATENT OFFICE.

JOSEPH GUERZONI AND RODOLPHE PECHKRANZ, OF GENEVA, SWITZERLAND.

AUTOMATIC PROJECTION APPARATUS.

1,161,660.      Specification of Letters Patent.      Patented Nov. 23, 1915.

Application filed May 12, 1911. Serial No. 626,774.

*To all whom it may concern:*

Be it known that we, JOSEPH GUERZONI and RODOLPHE PECHKRANZ, citizens of Switzerland, residing at Geneva, Canton of Geneva, in the Confederation of Switzerland, have invented certain new and useful Improvements in and Relating to Automatic Projection Apparatus, of which the following is a specification.

Our present invention relates to that class of picture projecting machines in which there is a rotating receptacle or magazine for the plates which carry the pictures to be projected, an apparatus for automatically and successively projecting these pictures on a transparent screen which forms the front wall of a casing or a box in which the other parts are contained, so that the dimensions of the apparatus are relatively small, notwithstanding the fact that it may contain a great many pictures.

In our improved apparatus, the rays of light are reflected within the casing by three mirrors the planes of which form a prism with the transparent front wall of the casing; this reflection takes place in such a manner that the rays of light describe a closed path, in which they cross three times within the casing or box. The light is first reflected by a small mirror to a larger one arranged in the upper part of the casing, and from this second mirror to a third one, which is larger than the second mirror, and is also arranged within the casing.

In order to make it possible to employ a large number of pictures the plates are arranged side by side in a revoluble cylindrical magazine, in radial positions, and by the use of a suitable mechanism, in the projection of the pictures, these plates are brought successively into the path of the rays of light. The apparatus is driven by a motor which is advantageously placed within the casing. In order to obtain a noiseless and positive working of the apparatus the actuating mechanism is preferably driven indirectly by the motor, as will be hereinafter particularly described.

In the accompanying drawing Figure 1 is a vertical section of an apparatus embodying our present invention. Fig. 2 is a plan view on an enlarged scale showing one end of the apparatus, Fig. 2ª is a plan view also on an enlarged scale showing the other end of the apparatus, and Figs. 3 to 10 are detail views of the different parts of the apparatus.

Referring to the drawing we prefer to employ a casing or box the front wall of which is formed by a frame $a$ (Fig. 1) in which is secured a transparent screen $a^1$. In the lower part of the box or casing is fixed the mechanism for driving the plates which carry the pictures, a source of light $e$, a condenser $d$, a first mirror $b$, and an objective lens $f$. As will be understood instead of the mirror $b$ a prism may be employed.

In the upper part of the casing or box mirrors $b^1$, $b^2$ are arranged. These mirrors reflect the rays of light to the screen $a^1$, as is shown in Fig. 1. The source of light $c$ (Figs. 1, and 3), the condenser $d$, the mirror $b$, the objective lens $f$ and the guides $e$ for the upper part of the plates carrying the pictures are all arranged on a support-plate $g$. Below this plate $g$ a cylindrical magazine $h$ is revolubly mounted on an inclined spindle $h^3$ as shown in Figs. 1 and 10. In this magazine the plates $i$, carrying the pictures, are arranged so that they can be moved freely in guide-grooves, provided in the side walls of the magazine and when in place the plates are in radial positions in the magazine. These guide-grooves are indicated by $h^2$ in Fig. 9 of the drawing.

The mechanism by which the parts are operated (Figs. 1 and 3) preferably comprises a motor $k$ (Fig. 2), a worm $k^1$, a wheel $l^1$ and a cam shaft $l$ (Fig. 2). On this shaft a first cam $l^2$ is fixed for driving a mechanism by means of which the plates are displaced one after the other in their own plane, in such a manner that the upper part of each successive plate moves in its guides $e$ while the lower part remains in the magazine. The details of this mechanism are shown in Figs. 4 and 5. This mechanism comprises an arm $m$ which carries a pulley $m^1$ adapted to bear against the periphery of the cam $l^2$ and is maintained in position against this periphery by means of a spring $m^2$ which acts upon the arm $m$ as shown in Fig. 4. On its free end the arm $m$ carries another pulley $m^2$ over which a chain $m^3$ passes. One end of this chain is fixed at $m^4$ to the frame of the apparatus. The chain $m^3$ also passes over a pulley $m^5$ mounted in the frame of the apparatus and the other end of the chain is fixed on a cross piece $m^6$. At one end the latter is provided with a guide bar $m^7$ (Fig. 5) which moves in guides $m^8$, $m^9$ on the frame, and at the other end of the cross piece $m^6$ there is a bar $m^{10}$ which slides in a guide $m^{11}$ on the frame. As often as the pulley $m^1$ enters the recess $l^3$ in the cam $l^2$ the bar $m^{10}$ enters one of the holes $h^1$ (Figs. 2ª and 9) in the bottom of the magazine and raises the plate in the corresponding grooves $h^2$ by exerting an upward pressure on the lower edge of the plate. The upper part of the plate which has been raised enters the guides $e$ (Fig. 6) and the upper edge of the plate contacts with a shoe $n^{10}$ which is pivoted on one end of an arm $n^1$ of a lever $n$. The lever $n$ is pivoted at $n^2$ on one of the guides $e$ and is provided with an arm $n^3$ the free end of which forms a head with oppositely inclined planes $n^4$, $n^5$. Moving upon these planes is a pulley $n^6$ mounted in the end of an arm $n^7$ which is pivoted on the other guide $e$. The arm $n^7$ is further connected to the other guide by a spring $n^8$ which tends to maintain the pulley $n^6$ in contact with the inclined planes of the head of the arm $n^3$. Whenever a plate $i$ is raised the lever $n$ is rocked whereby the pulley $n^6$ leaves the inclined plane $n^4$ and is brought on to the inclined plane $n^5$. As soon as the pulley is brought onto the plane $n^5$ the pressure exerted by the pulley $n^6$ upon $n^5$ causes the lever $n$ to swing until the free end of the arm $n^9$ contacts with one side of the raised plate and maintains the same in its position, with the lower part of the plate still remaining in the magazine.

The upper end of the bar $n^{11}$ (Figs. 3 and 6) is pivoted to the lever $n$ and the lower part of the bar $n^{11}$ is adapted to slide in a guide provided therefor in the plate $g$. The lower end of the bar $n^{11}$ contacts at certain times with a head piece $o^1$ of a bar $o$, which is pivoted to one of the ends of a lever $o^3$, and which slides in a guide $o^2$ fixed on the frame. This lever $o^3$ is actuated by a spring $o^5$ which is shown in Fig. 3 and by which a pulley $o^4$ mounted in the opposite end of the lever $o^3$ is pressed against the periphery of a cam $l^4$ which is also fixed on the cam shaft $l$. The cam $l^4$ is provided with a recess $l^5$ and a face against which during a part of the revolution of the cam the spring acting upon the lever $o^3$ maintains the pulley $o^4$. The pulley $o^4$ moves on the periphery of the cam and falls into the recess $l^5$ whereby the lever $o^3$ is rocked and the head $o^1$ moved upwardly and brought against the lower end of the bar $n^{11}$, to rock the lever $n$ (Fig. 6). In this manner the pulley $n^6$ is brought back to the inclined plane $n^4$ of the head of the arm $n^3$. The pressure of the pulley on this inclined plane causes a rocking movement of the lever $n$, in the opposite direction during which the shoe $n^{18}$ attached to the end of the lever $n^1$, strikes the upper edge of the raised plate $n$. This plate which has been freed from the arm $n^9$ is now returned to its position of rest in the magazine by this action of the shoe $n^{10}$.

On the cam-shaft is fixed a third cam $l^6$, by means of which the mechanism represented in Figs. 7 and 8 is driven in order to drive the magazine. This mechanism preferably comprises a suitably mounted oscillating shaft $p$ to which is fixed an arm $p^1$ carrying a spring actuated pawl $p^2$, the tooth of which enters the holes $h^1$ in the bottom of the magazine. Fixed on the shaft $p$ is another arm $p^3$ which is actuated by a spring $p^4$, and the arm $p^3$ carries a pulley $p^5$ which by the spring $p^4$ is pressed against the periphery of the cam $l^6$. The cam $l^6$ is provided with a recess, and the face $l^7$ is so formed that during a part of a revolution of the cam the spring $p^4$ gradually expands, whereby simultaneously the pawl $p^2$ is moved gradually backward from the right to the left in Fig. 7. During the movement of the pulley $p^5$ on the face $l^8$ of the recess of the cam $l^6$ the spring $p^4$ is compressed and causes the advancement of the pawl $p^2$. The latter engages a hole $h^1$ in the magazine and imparts a progressive movement to the magazine. The magazine is then, after having been moved a predetermined distance, maintained in its new position by a spring actuated bar $r$ (Figs. 2ª, 4 and 5) which is provided on one end with an obtuse point which successively enters the holes $h^1$, so that the magazine is intermittently stopped and maintained in such a position that the bar $m^{10}$ may enter one of the holes $h^1$. Loosely mounted on the shaft $l$ we also employ two eccentric weights $s$ which are each provided with a pin $s^1$ and a pin $s^2$ (Fig. 2). These pins $s^1$ are engaged by a pin $t^1$ which is carried by a collar $t$ fixed on the shaft $l$. During the rotation of the shaft $l$ the weights $s$ are alternately swung by the pin $t^1$ during a part of each revolution of the shaft until the center of gravity of each weight is carried above the axis of the shaft $l$ and passes the vertical plane which passes through this axis, so that the weights successively turn approximately half a revolution under the action of the force of gravity. During this latter movement the pins $s^2$ (Figs. 2, 3 and 4) of the weights $s$ act alternately upon a pin $u^1$ which is carried by a head piece fixed on the lower end of a bar $u$ (Fig. 3). At its upper end, the bar $u$ carries a shutter $v$. The bar $u$ is inclined so that the shutter $v$ by its own weight is maintained in both its closed and open positions, the change of the shutter from one of these positions in which it prevents the passage of the rays of light from the source of light $c$ to the condenser $d$, to the other position in which it permits the passage of the rays, being produced by the alternate action of the pins $s^2$ upon the pin $u^1$. As will be understood the mirrors which are arranged in the box or casing may be replaced by prisms.

In the operation of the hereinbefore described apparatus the motor being started when the different parts of the apparatus occupy the positions shown in the figures of the drawing, the rotation of the shaft $l$ first brings the recess $l^3$ of the cam $l^2$ opposite the pulley $m^1$ which enters the same, while the arm $m$ oscillates under the action of its spring and brings the upper part of one of the plates of the magazine into the guides $e$. One of the weights $s$ then effects the opening of the shutter $v$ in such a manner that the light is permitted to pass and the image appears on the screen $a^1$ until the second weight $s$ effects the closing of the shutter. During this time the bar $m^{10}$ is gradually returned and the spring of the arm $m$ is set for a new movement. After the closing of the shutter the recess $l^5$ of the cam $l^4$ comes opposite the pulley $o^4$ which enters it causing the plate to return to its resting position in the magazine whereafter the pulley $p^5$ rolls on the face $l^8$ of the cam $l^6$ and the pawl $p^2$ causes the magazine to advance. At this moment the cam-shaft has turned a whole revolution and the different parts of the apparatus are returned to the positions shown in the drawing and hence are again ready for producing, in an analogous manner, the projection of the second and successive pictures.

We claim as our invention:

1. In an apparatus for projecting pictures, the combination with a frame, a revoluble magazine and optical devices above said magazine for projecting pictures, of a motor, a shaft turned thereby, a cam on said shaft, a rocker arm, a roller carried by the rocker arm, means for maintaining the said roller against the face of the said cam, a cross bar, a connection between the said cross bar and rocker arm so that the said cross bar may be raised and lowered by the movement of the rocker arm, a reciprocating bar connected to the said cross bar and adapted when raised thereby to engage the edge of a plate in the said magazine to raise the same into position for projecting, devices for holding the plate in its raised position and after use returning it to the said magazine, and means for imparting a step by step movement to the said magazine.

2. In an apparatus for projecting pictures, the combination with a frame, a revoluble magazine and optical devices above said magazine for projecting pictures, of a motor, a shaft turned thereby, a cam on said shaft, a rocker arm, a roller carried by the rocker arm, means for maintaining the said roller against the face of the said cam, a cross bar, a connection between the said cross bar and rocker arm so that the said cross bar may be raised and lowered by the movement of the rocker arm, a reciprocating bar connected to the same cross bar and adapted when raised thereby to engage the edge of a plate in the said magazine to raise the same into position for projecting, a three-armed lever, a plate engaging member connected to one of the arms of said lever and adapted to be engaged by the plate when raised from its position in said magazine, to move the second arm of said lever into engagement with one side of the raised plate, inclined faces at one end of the third arm of the said lever, a control lever pivotally mounted at one end, a roller carried by the free end of the said control lever and adapted to engage said inclined faces at the end of the third arm of the aforesaid lever to maintain the same in both its operative and inoperative positions, a second cam on the said shaft, devices operated by the said second cam for moving the said three-armed lever from its operative to its inoperative positions, and means for imparting a step by step revoluble movement to said magazine.

3. In an apparatus for projecting pictures, the combination with a frame, a revoluble magazine and optical devices above said magazine for projecting pictures, of a motor, a shaft turned thereby, a cam on said shaft, a rocker arm, a roller carried by the rocker arm, means for maintaining the said roller against the face of the said cam, a cross bar, a connection between the said cross bar and rocker arm so that the said cross bar may be raised and lowered by the movement of the rocker arm, a reciprocating bar connected to the said cross bar and adapted when raised thereby to engage the edge of a plate in said magazine to raise the same into position for projecting, devices actuated by a plate in being raised from its place in the magazine for temporarily maintaining the plate in its raised position and after use returning it to its place in the magazine, a rocker shaft, a cam on the aforesaid shaft for operating the rocker shaft, an arm extending from the said rocker shaft, a pawl pivotally mounted on the end of the arm and projections regularly spaced in the said magazine by which through successive engagement with the said pawl through the said rocker shaft the magazine is given a step-by-step revoluble movement.

4. In an apparatus for projecting pictures, the combination with a frame, a revoluble magazine and optical devices above said magazine for projecting pictures, of a motor, a shaft turned thereby, a cam on the said shaft, a rocker arm, a roller carried by the said rocker arm, means for maintaining the said roller against the face of the said cam, a cross bar, a connection between the said rocker arm and cross bar whereby through the movement of the rocker arm the cross bar is raised and lowered, a reciprocating bar connected to the said cross bar and adapted when raised thereby to engage the lower edge of a plate in the said magazine to raise the same to position for projecting, a three-armed lever, oppositely inclined faces at the end of one arm of said lever, an actuating lever pivoted to the frame at one end thereof, a roller mounted on the free end of the said actuating lever and adapted to engage said inclined faces of the end of one arm of the said lever to maintain the same in both its operative and inoperative positions, a plate engaging member pivotally connected to the end of another arm of the said lever and adapted to be engaged by the top edge of a plate when raised from the magazine and by this engagement to throw the said lever from its inoperative to its operative position thereby moving the lever and causing the end of the third arm thereof to engage the side of the said plate to maintain the same in its raised position, and causing the roller at the end of the said actuating lever to pass to the other inclined face on the end of the first arm of the said lever, thereby maintaining the same in its operative position, a second cam on the said shaft, devices operated thereby for moving the said lever from its operative to its inoperative position, a rocker shaft, a third cam on said shaft for actuating the said rocker shaft, an arm connected to the said rocker shaft, a pawl connected to the free end of the said arm, a series of spaced projections on the said magazine through which, by engagement with the said pawl and actuated by the said rocker shaft a regular step by step movement is imparted to the said magazine.

In testimony whereof we have affixed our signatures in presence of two witnesses.

JOSEPH GUERZONI.
RODOLPHE PECHKRANZ.

Witnesses:
S. IMER,
L. D. MUNIERY.